(12) United States Patent
Pasino

(10) Patent No.: US 8,474,850 B2
(45) Date of Patent: Jul. 2, 2013

(54) LUBRICATED GUIDE UNIT FOR A MOTORCYCLE FORK TUBE

(75) Inventor: Roberto Pasino, Castellero (IT)

(73) Assignee: Aktiebolaget SKF, Göteborg (SE)

( * ) Notice: Subject to any disclaimer, the term of this patent is extended or adjusted under 35 U.S.C. 154(b) by 96 days.

(21) Appl. No.: 13/157,933

(22) Filed: Jun. 10, 2011

(65) Prior Publication Data

US 2011/0304120 A1    Dec. 15, 2011

(51) Int. Cl.
*B62K 25/06* (2006.01)
(52) U.S. Cl.
USPC .................. 280/276; 188/282.1; 188/285
(58) Field of Classification Search
USPC ........................... 280/276, 277, 275; 384/16
See application file for complete search history.

(56) References Cited

U.S. PATENT DOCUMENTS

| 3,524,658 | A |   | 8/1970  | De Carbon |          |
|-----------|---|---|---------|-----------|----------|
| 4,553,769 | A | * | 11/1985 | Kawaguchi | 280/276  |
| 6,089,585 | A |   | 7/2000  | Theobald  |          |
| 6,105,945 | A |   | 8/2000  | Takeuchi et al. | |
| 6,260,832 | B1| * | 7/2001  | Vignocchi et al. | 267/64.15 |
| 7,472,918 | B2| * | 1/2009  | Turner    | 280/284  |
| 2005/0087953 | A1 | * | 4/2005 | Becker et al. | 280/276 |

FOREIGN PATENT DOCUMENTS

| DE | 102008009426 A1 | 8/2009 |
| EP | 2239481 A1 | 10/2010 |
| GB | 2137289 A | 10/1984 |

* cited by examiner

*Primary Examiner* — Tony H. Winner
*Assistant Examiner* — Jacob Knutson
(74) *Attorney, Agent, or Firm* — Mark A. Ussai; Bryan Peckjian

(57) ABSTRACT

A lubricated guide unit is for a motorcycle fork tube that includes an outer tube and an inner tube telescopically slidable within the outer tube. The guide unit includes upper and lower sliding bushings axially spaced apart and disposed within a cavity of the outer tube and guide sliding movement of the inner tube. A first sealing device is mounted at an open end of the outer tube and seals against the outer surface of the inner tube. A second sealing device is mounted in the outer tube and seals against the outer surface of the inner tube. The second sealing device is axially spaced from the first sealing device such that a sealed, lubrication chamber is defined between the two sealing devices and the facing circumferential surfaces of the inner and outer tubes, the two bushings being disposed within the chamber.

10 Claims, 6 Drawing Sheets

LUBRICATED GUIDE UNIT FOR A MOTORCYCLE FORK TUBE

CROSS-REFERENCE TO RELATED APPLICATIONS

This application claims priority to Italian patent application no. TO2010A000502 filed on Jun. 11, 2010, which is incorporated fully herein by reference.

BACKGROUND OF THE INVENTION

The present invention relates to a guide unit for a motorcycle fork tube.

Motorcycles fork tubes include an outer tube and an inner tube slidable within the outer tube and inserted in this through an opening. The translation is made possible by two bushings interposed between the inner tube and the outer tube. The bushings are lubricated with the oil that completely fills the cavity of the inner tube and of the outer tube in which the inner tube slides. This cavity is closed on the outside by a seal mounted on the outer tube around the opening through which the inner tube is inserted.

SUMMARY OF THE INVENTION

It is a primary object of the invention to provide a fork lighter than conventional ones. Other objects of the invention are to help protecting the environment by reducing the amount of oil used in the fork and to optimize the lubrication of bushings.

These and other objects and advantages are achieved, according to the invention, by a guide unit for a fork tube having the features set forth herein and in the appended claims. In summary, the invention proposes to reduce the amount of oil in the fork to the strict minimum needed to lubricate the sliding bushings, by limiting the amount of oil in the fork tube to the volume confined between the inner tube, the outer tube and two seals located above the upper bushing and below the lower bushing, respectively. The lubricated area is so limited to the volume affected by the sliding of the bushings. Owing to this arrangement, the fork is lightened of the mass of oil conventionally filling the inner tube.

In one aspect, the present invention is a lubricated guide unit for a motorcycle fork tube, the fork tube including an outer tube, the outer tube having an inner circumferential surface defining a cavity and an open end, and an inner tube telescopically slidable within the outer tube and having an outer circumferential surface. The guide unit basically comprises upper and lower sliding bushings axially spaced apart, disposed within the outer tube cavity and configured to guide sliding movement of the inner tube. A first sealing device is mounted within the outer tube cavity proximal to the tube open end and is configured to seal against the outer surface of the inner tube. Further, a second sealing device is mounted within the outer tube cavity and is configured to seal against the outer surface of the inner tube. The second sealing device is axially spaced from the first sealing device such that a sealed lubrication chamber is defined between the two sealing devices and the facing circumferential surfaces of the inner and outer tubes, the two bushings being disposed within the chamber.

In another aspect, the present invention is a motorcycle fork tube comprising an outer tube having an inner circumferential surface defining a cavity and an open end, an inner tube telescopically slidable within the outer tube and having an outer circumferential surface, and a guide unit as described in the preceding paragraph.

BRIEF DESCRIPTION OF THE SEVERAL VIEWS OF THE DRAWINGS

The structural and functional features of a few preferred but non-limiting embodiments of a guide unit for a fork tube according to the invention will now be described; reference is made to the accompanying drawings, in which.

DETAILED DESCRIPTION OF THE INVENTION

Figure 1:
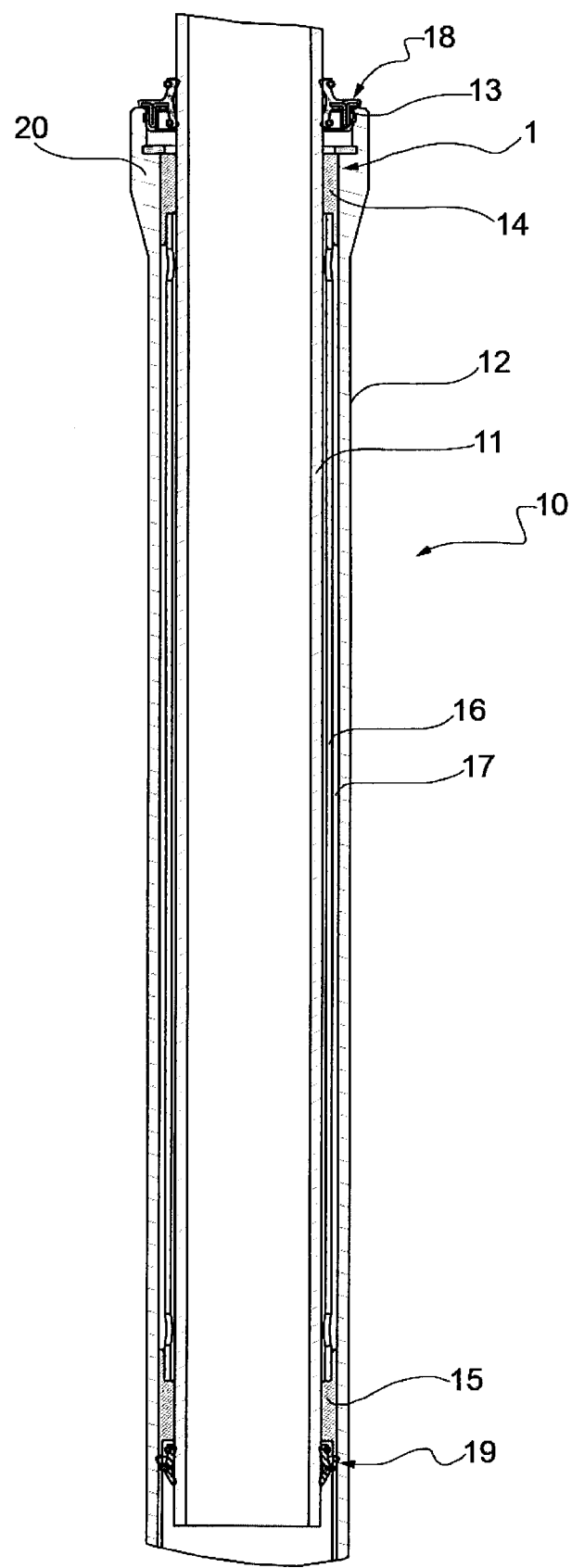
FIG. 1 is a longitudinal cross-sectional view of a first embodiment of a guide unit for a motorcycle fork tube according to the invention.
Figure 2:
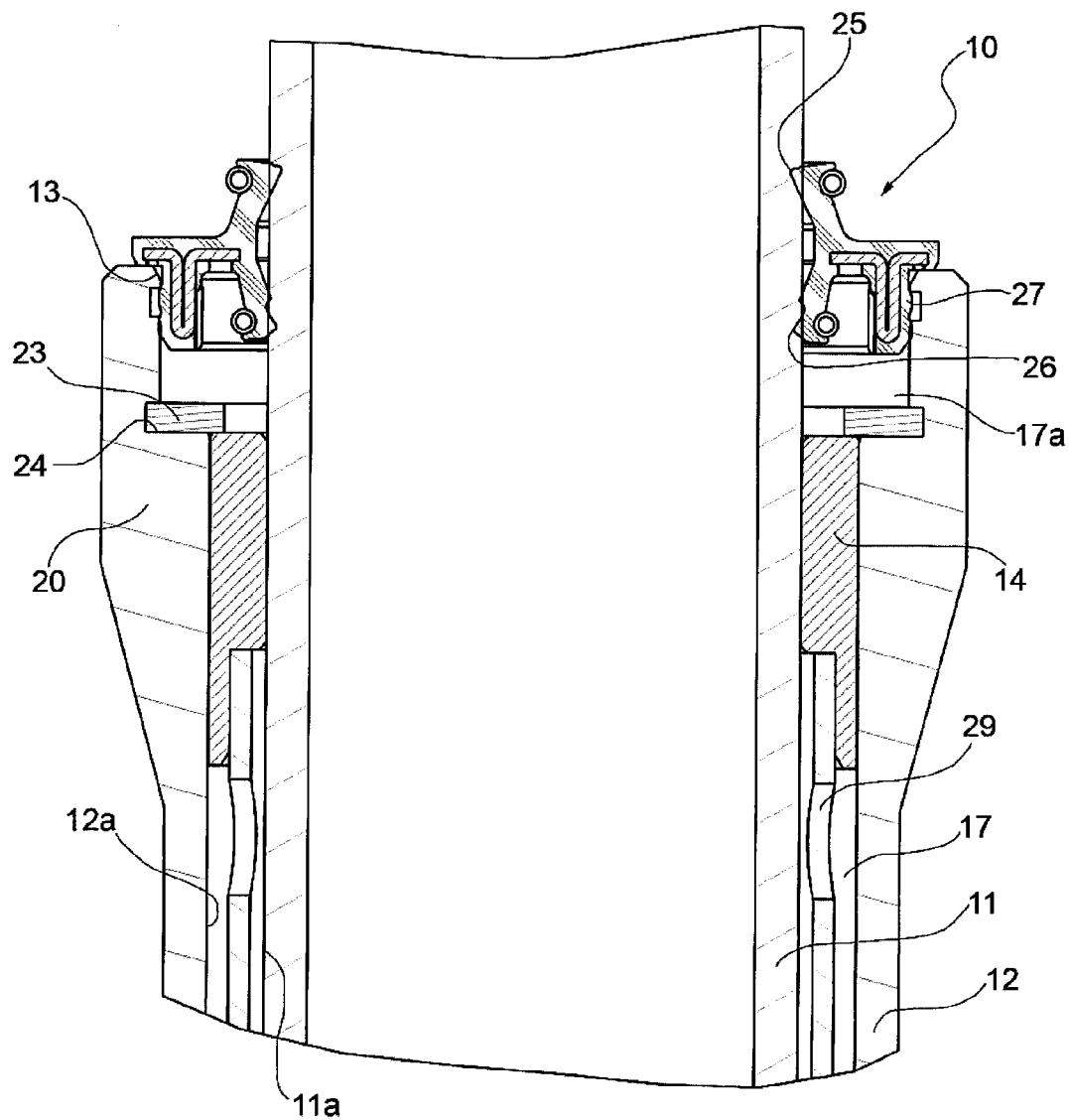
FIG. 2 is an enlarged view of the upper part of FIG. 1.

With reference initially to FIGS. 1 and 2, a first embodiment of a guide unit 1 for a motorcycle fork tube 10 is depicted. In most implementations, the fork tube 10 is intended to make up a motorcycle fork including two parallel fork tubes connectable to the motorcycle steering head through two plates.

The fork tube 10 includes two coaxial tubes 11 and 12, which are telescopically sliding into one another, hereinafter termed inner tube 11 and outer tube 12. The outer tube 12 has an inner circumferential surface defining a cavity 12b and an opening or open end 13 for the introduction of the inner tube 11. The inner tube 11 is telescopically slidable within the outer tube 12 and has an outer circumferential surface.

The guide unit 1 includes a pair of sliding bushings 14, 15, which allow the relative sliding between the inner tube 11 and the outer tube 12. The bushings 14, 15 are disposed within the cavity 12b of the outer tube 12 with small tolerances with respect to the inner tube 11. The bushings 14, 15 are so radially interposed between the outer tube and the inner tube and are axially spaced from one another. In the presently preferred embodiment, the bushings 14, 15 are separated by a tubular spacer 16, which is part of the unit 1 and is incorporated in the tubular gap defined between the outer tube 12 and the inner tube 11.

The mutually facing circumferential surfaces of the inner tube 11 and the outer tube 12, indicated 11a and 12a respectively, define therebetween a generally annular chamber or gap 17 in which both bushings 14, 15 are located. The chamber 17 contains an amount of oil for reducing to a minimum level the friction between the inner tube 11 and the outer tube 12 in their sliding relative movement. The top and the bottom of chamber 17 are sealed by a pair of annular sealing devices 18, 19, which are part of the unit 1 and are mounted in the cavity 12b of the outer tube 12 above the upper bushing 14 and below the lower bushing 15, respectively.

At the upper end, which in this example is the end providing the opening 13, the outer tube 12 forms an end portion 20 having an outer diameter greater than the outer diameter of a remainder of the tube 20. Preferably, the bushing 14 is disposed within the the central cavity 12b of the end portion 20 is the bushing 14. In the embodiment of FIG. 2, the bushing 14 is made up of a single piece of metal or plastics material.

Preferably, the bushing 14 is retained by a Seeger ring 23 partially housed in an annular groove 24 obtained in the cavity 12b of the outer tube 12.

The upper sealing device 18 is locked in the cavity 12b proximal to the opening/open end 13 of outer tube 12. The sealing device 18 is provided with a dust-cover lip 25, an oil-guard lip 26 adapted for sliding against the outer surface 11a of the inner tube 11, and a static sealing lip 27 forcefully locked in the opening 13. Designated at 17a is an upper portion of the lubrication chamber 17, limited between the outer tube 12, the inner tube 11, the upper sealing device 18 and the upper bushing 14.

Figure 3:
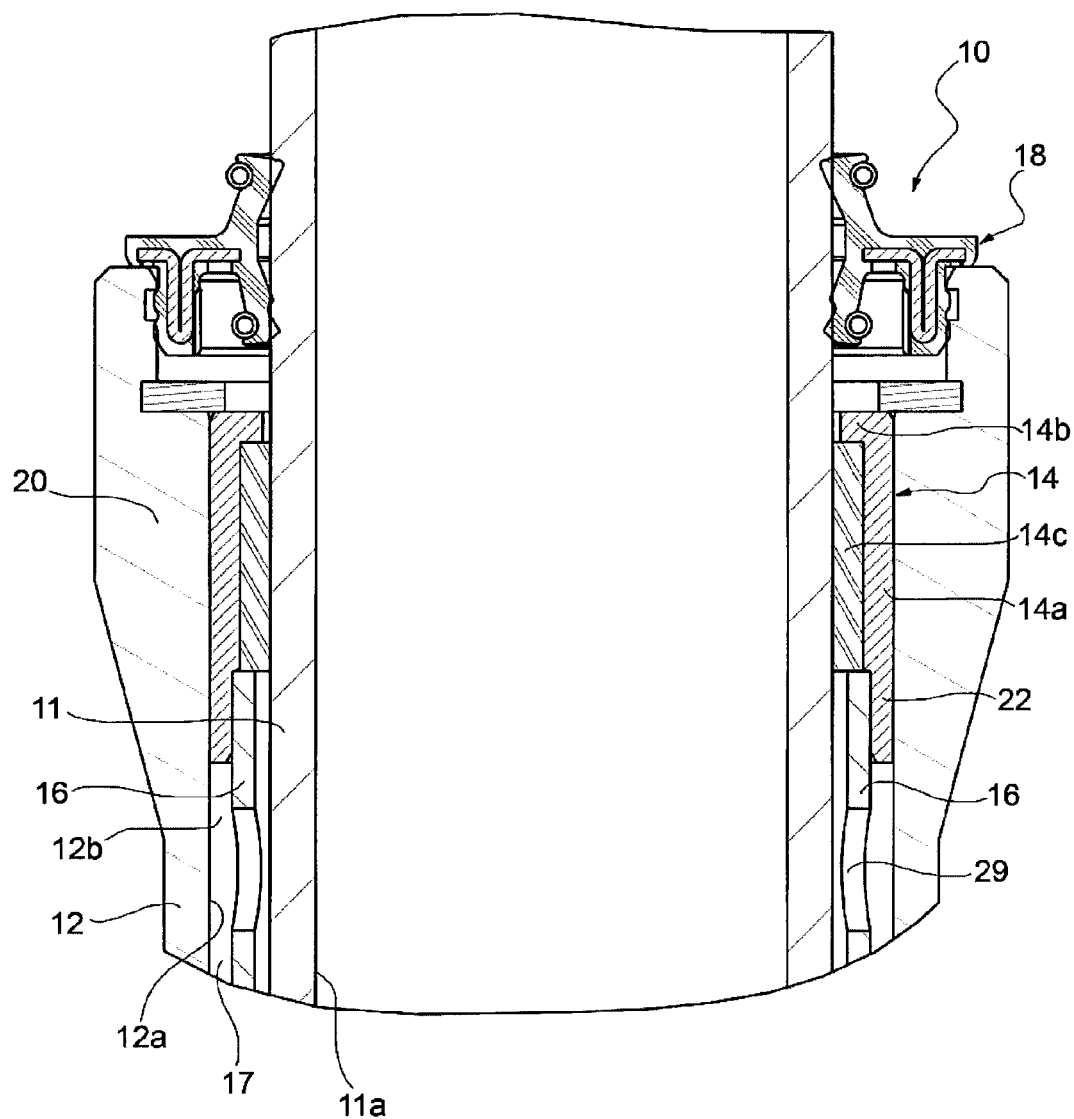
FIG. 3 is a view, similar to that of FIG. 2, of an alternative embodiment of the guide unit for the fork tube according to the invention.

In an alternative embodiment of FIG. 3, the bushing 14 includes a tubular element 14a with an inner flange 14b protruding or extending toward the inner tube 11 so as to lock an internal tubular insert 14c. The insert 14c forms the inner lining of the bushing suitable for contacting the inner tube 11. Preferably, the insert 14c is formed of a material with a low coefficient of friction, such as for example, PTFE. Alternatively, the insert 14c may be formed of a metallic material and the sliding surface of the inner tube 11 may be coated with a low friction material.

At the bottom, the upper bushing 14 provides has an enlarged diameter section 22 with an inner diameter greater than the inner diameter of the remainder of the bushing 14. With this structure, the upper end of the tubular spacer 16 is engaged in the enlarged diameter section 22 of the upper bushing 14. The spacer 16 is submerged in the oil that fills the chamber 17 and is preferably perforated so as to have a plurality of openings or passages 29 to ensure or at least facilitate lubrication on the outer surface 11a of inner tube 11.

Figure 4:
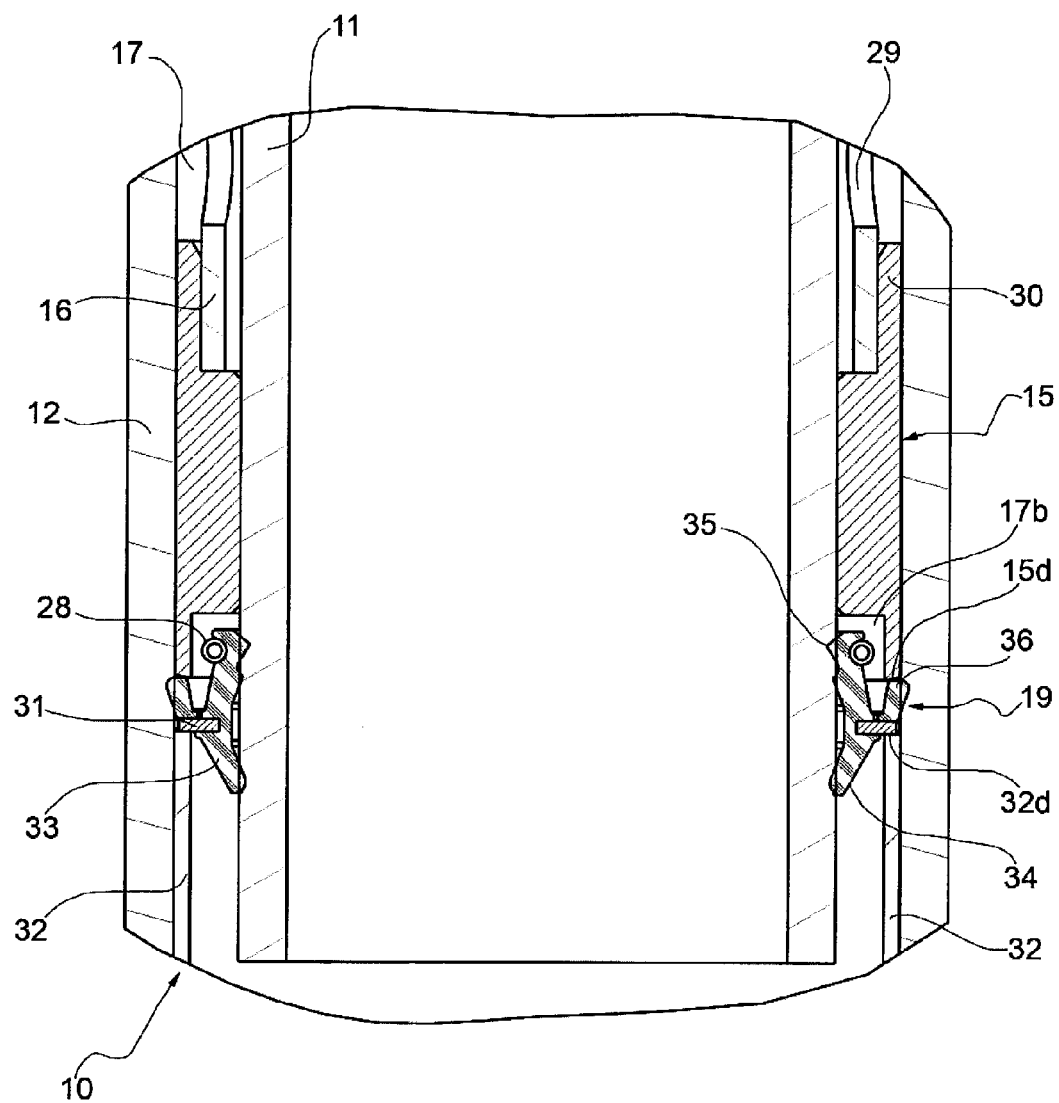
FIG. 4 is a enlarged view of the lower part of FIG. 1.

As shown in FIG. 4, in a preferred embodiment of the guide unit 1, the lower bushing 15 has an upper, enlarged diameter section 30 having an inner diameter greater than the inner diameter of the remainder of the bushing 15. With such a structure, the lower end of the tubular spacer 16 is engaged in the enlarged diameter section 30 of the lower bushing 15.

Preferably, the lower sealing device 19 includes a stiffening annular insert 31 and an annular body 33 of flexible elastic material. The annular insert 31, in this example having a rectangular cross-section, serves as a support element for the flexible body 33 and as a reinforcement to withstand the axial loads which the sealing device 19 is subjected to in operation. The sealing device 19 is preferably retained in the desired axial position, i.e., in the inner cavity 12b of the outer tube 12 below the lower bushing 15, by two axially facing shoulder surfaces 15d, 32d. In the preferred embodiment, the surfaces 15d and 32d are provided by a bottom edge 15d of the bushing 15 and an edge 32d of an inner, tubular or annular locking element 32 having a determined length and resting against the bottom of the outer tube 12. As an alternative to the tubular element 32, the shoulder surface 32d can also be provided by a "narrowing" in the internal diameter of the outer tube 12.

On the side axially below the stiffening ring 31, the annular body 33 of resiliently flexible material (e.g. rubber) forms a conical dust-cover lip 34, which tapers downwardly and internally so as to slidingly contact the inner tube 11. On the opposite or axially upper side with respect to the ring 31, the body 33 forms a radially inner oil-guard lip 35. In the preferred embodiment, the oil-guard lip 35 is clamped in a radially internal direction by a circumferential spring 28 housed in a groove formed in a radially outer surface of the oil-guard lip 35 so as to ensure a sliding contact pressure of this lip against the inner tube 11. The flexible body 33 also forms a radially outer static sealing lip 36, resiliently compressed against the surface of the inner cavity of the outer tube.

It will be noted that the dust-cover 34 lip and oil-guard 35 lips extend from opposite sides of the ring or insert 31 so as to generally define obtuse angle. Such a structure provides the body with a reduced radial size (approximately of about 4 mm), which allows a reduction in the outer diameter of the outer tube 12, thereby enabling the fork tube and the associated fork to be fabricated with a more compact external size and with a reduced weight.

A lower portion 17b of the lubrication chamber 17 is bounded between the outer tube 12, the inner tube 11, the bottom sealing device 19 and the lower bushing 15. The upper and lower portions 17a and 17b of the lubrication chamber 17 communicate with the central part of the lubrication chamber 17 by virtue of the radial clearance (not shown in the drawings) provided between the bushings 14 and 15 and the inner tube 11.

Having confined the oil in the area strictly necessary to lubricate the surface affected by the sliding of the inner tube 11, the space within the inner tube 11 contains air instead of oil, causing an overall weight reduction of the fork tube and of the related fork in working conditions. Thereby, the non-suspended masses connected to the motorcycle wheel are also reduced, consequently improving of the dynamic properties of the motorcycle.

Figure 5:
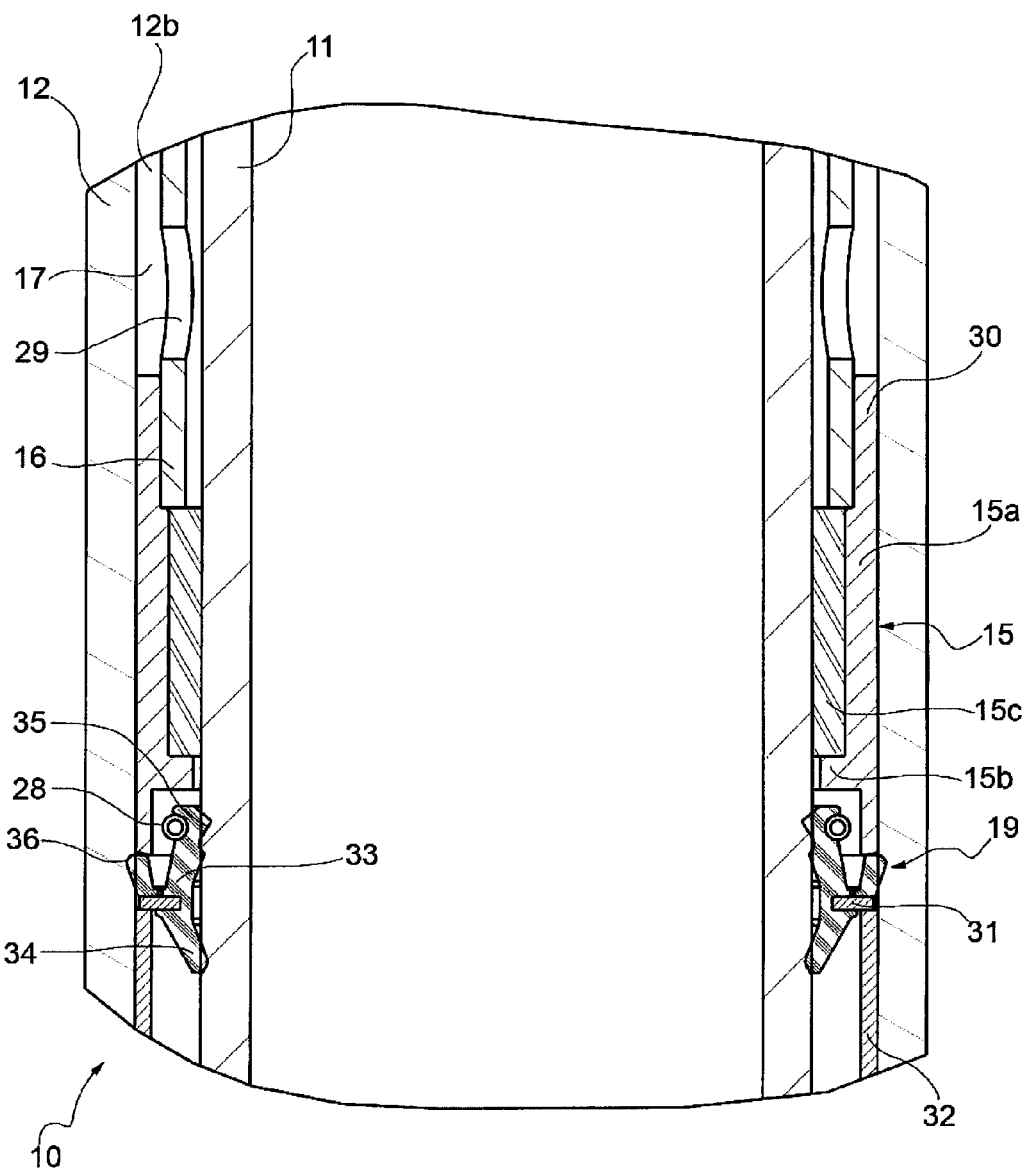
FIGS. 5 and 6 are two views, similar to that of FIG. 4, of two further alternative embodiments of the invention.

As shown in FIG. 5, in an alternative embodiment of the guide unit 1, the lower bushing 15 is made in two pieces and includes a tubular element 15a with an inner flange 15b protruding toward the inner tube 11 so as to lock an internal tubular insert 15c. The insert 15c forms the inner lining of the bushing suitable for contacting the inner tube 11. The insert 15c is preferably formed of a material with low coefficient of friction, such as for example, PTFE. Alternatively, the insert 15c may be made of a metallic material and the surface sliding against the inner tube 11 may be coated with a low friction material, such as PTFE.

Figure 6:
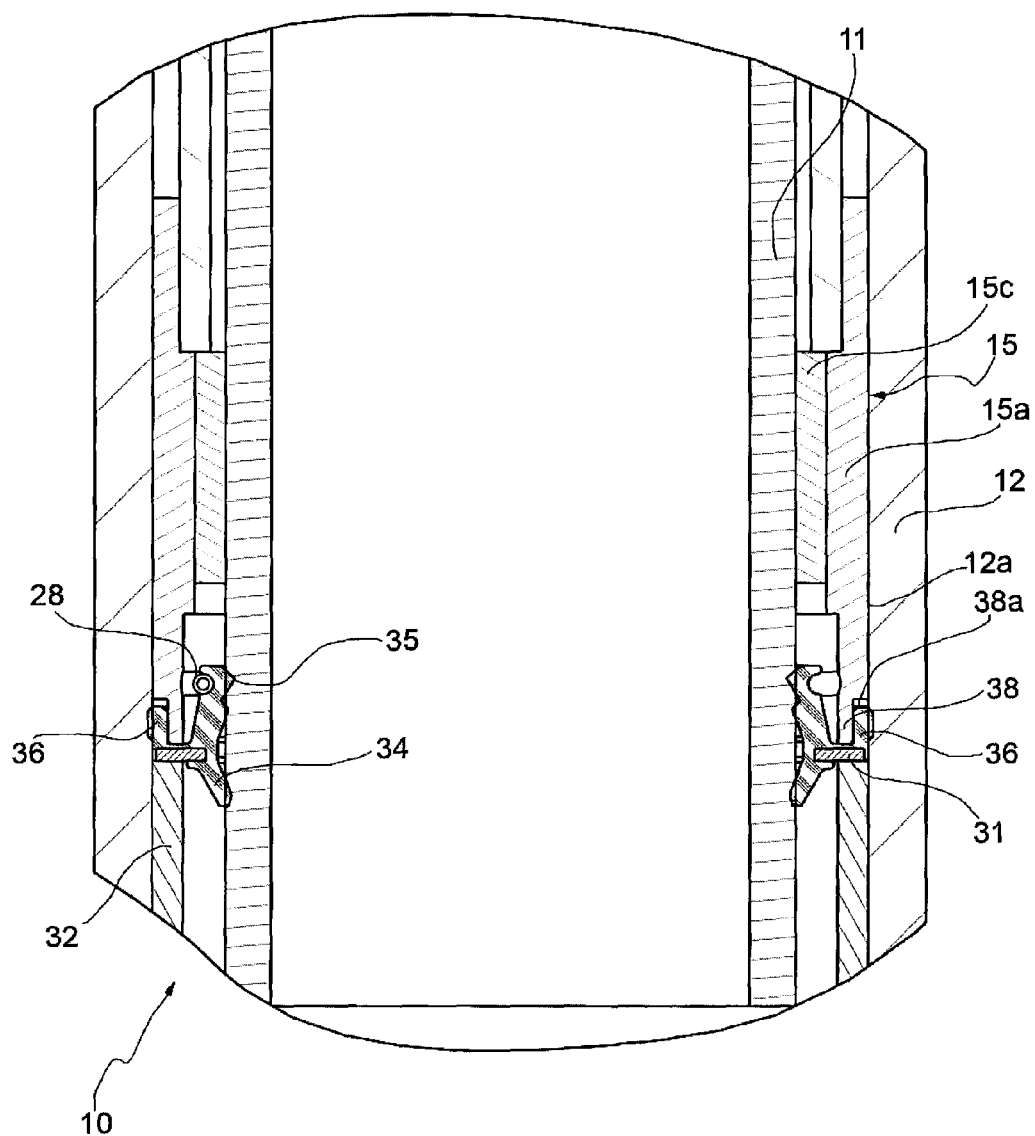

In the variant depicted in FIG. 6, the bushing 15 has an axially protruding bottom edge 38 having an outer diameter that is lesser than the inner diameter of the inner circumferential surface 12a of the outer tube 12. Thus, the bushing 15 and the inner circumferential surface 12a together form an annular cavity 38a, in which the external static sealing lip 36 of flexible body 33 is "pinched" or clamped between the bushing 15 and the outer tube 12. The shape of the bushing 15 is clearly also applicable to one-piece bushings such as that shown in FIG. 4.

It is understood that the invention is not limited to the embodiments described and illustrated herein, which are to be considered as implementing examples of a lubricated guide unit of a fork tube. Rather, the invention is likely to be modified as to its shape and parts, functional and constructional details and materials being used. For example, the invention can be either applied also to USD (Up Side Down) fork tubes. It will also be evident that the invention is equally applicable to the construction of a single arm, telescopic hydraulic fork. The invention can also be implemented with both forks of the sliding type and/or rotating type. The invention is intended to embrace all the variants included in its scope, as defined by the following claims.

I claim:

1. A lubricated guide unit for a motorcycle fork tube, the fork tube including an outer tube, the outer tube having an inner circumferential surface defining a cavity and an open end, and an inner tube telescopically slidable within the outer tube and having an outer circumferential surface, the guide unit comprising:

upper and lower sliding bushings axially spaced apart, disposed within the outer tube cavity and configured to guide sliding movement of the inner tube; and a first sealing device mounted within the outer tube cavity proximal to the tube open end and configured to seal against the outer surface of the inner tube; and a second sealing device mounted within the outer tube cavity and configured to seal against the outer surface of the inner tube, the second sealing device being axially spaced from the first sealing device such that a sealed lubrication chamber is defined between the two sealing devices and the facing circumferential surfaces of the inner and outer tubes, the two bushings being disposed within the chamber, and a tubular spacer disposed within the lubrication chamber and configured to retain the upper and lower bushings spaced apart from each other, wherein the tubular spacer is perforated so as to facilitate lubrication of the outer surface of the inner tube.

2. The lubricated guide unit according to claim 1, wherein the first sealing device is an upper sealing device and the second sealing device is a lower sealing device, the lower sealing device being disposed generally beneath the lower bushing.

3. The lubricated guide unit according to claim 1, wherein:
each one of the upper and lower bushings has an enlarged diameter section with an inner diameter greater than an inner diameter of a remainder of the bushing; and
the tubular spacer has opposing ends, each tubular spacer end being engaged in the enlarged diameter section of a separate one of the upper and lower bushings.

4. The lubricated guide unit according to claim 1, wherein:
one of the upper and lower bushings is located more proximal to the second sealing device than the other one of the bushings, the one, proximal bushing having an enlarged diameter section with an inner diameter greater than an inner diameter of a remainder of the bushing; and
the second sealing device is at least partially disposed within a portion of the enlarged diameter section of the one, proximal bushing.

5. The lubricated guide unit according to claim 1, wherein the second sealing device includes a stiffening annular insert and an annular body of elastically flexible material, the annular body having a radially inner dust-cover lip and a radially inner oil-guard lip, the two inner lips extending from opposite sides of the insert so as to generally define an obtuse angle, and a radially outer, static sealing lip elastically compressed against the inner surface of the outer tube.

6. The lubricated guide unit according to claim 5, wherein:
the inner surface of the outer tube has an inner diameter;
one of the upper and lower bushings is located more proximal to the second seal device than the other one of the bushings, the one, proximal bushing having a generally axially-extending edge with an outer diameter, the outer diameter being lesser than the inner diameter of the outer tube so as to define a generally annular cavity; and
the static sealing lip of the second sealing device flexible body is disposed within the annular cavity so as to be clamped between the one, proximal bushing and the outer tube.

7. The lubricated guide unit according to claim 1 further comprising an annular locking element fixed within the cavity of the outer tube and having a radial shoulder surface and wherein:
one of the upper and lower bushings is located more proximal to the second sealing device than the other one of the bushings, the one, proximal bushing having an edge providing a radial shoulder surface generally facing the locking element shoulder surface; and
the second sealing device is axially locked within the inner cavity of the outer tube by the bushing shoulder surface and the locking element shoulder surface.

8. The lubricated guide unit according to claim 1, wherein one of the upper and lower bushings is located more proximal to the second seal device than the other one of the bushings and the one, proximal bushing includes a covering portion formed of a material with a low friction coefficient.

9. The lubricated guide unit according to claim 1, wherein the inner tube contains one of a gas and a gas mixture.

10. A motorcycle fork tube comprising:
an outer tube having an inner circumferential surface defining a cavity and an open end;
an inner tube telescopically slidable within the outer tube and having an outer circumferential surface; and
a guide unit including upper and lower sliding bushings axially spaced apart, disposed within the outer tube cavity and configured to guide sliding movement of the inner tube, a first sealing device mounted proximal to the open end of the outer tube and configured to seal against the outer surface of the inner tube, and a second sealing device mounted in the outer tube and configured to seal against the outer surface of the inner tube, the second sealing device being axially spaced from the first sealing device such that a sealed lubrication chamber is defined between the two sealing devices and the facing circumferential surfaces of the inner and outer tubes, the two bushings being disposed within the chamber, and
a tubular spacer disposed within the lubrication chamber and configured to retain the upper and lower bushings spaced apart from each other, wherein
the tubular spacer is perforated so as to facilitate lubrication of the outer surface of the inner tube.

\* \* \* \* \*